United States Patent [19]
Schneider et al.

[11] Patent Number: 5,363,537
[45] Date of Patent: Nov. 15, 1994

[54] VEHICLE WINDOW WEATHER SEAL RETAINING CLIP

[75] Inventors: Steven E. Schneider, Rochester Hills, Mich.; Rick L. Rogers, Wabash; Eric E. Gardner, Hartford, both of Ind.

[73] Assignee: GenCorp Inc., Fairlawn, Ohio

[21] Appl. No.: 61,126

[22] Filed: May 13, 1993

[51] Int. Cl.$^5$ ............................................. A44B 17/00
[52] U.S. Cl. ........................................ 24/289; 24/295; 49/377
[58] Field of Search .................. 24/289, 290, 291, 292, 24/293, 294, 295, 453; 49/377, 493.1

[56] References Cited

U.S. PATENT DOCUMENTS

| | | |
|---|---|---|
| 477,970 | 6/1892 | Taylor . |
| 776,549 | 12/1904 | Redington . |
| 788,335 | 4/1905 | Shepard . |
| 800,937 | 10/1905 | Parkes . |
| 804,905 | 11/1905 | Weaver, Jr. . |
| 1,533,702 | 4/1925 | Gerla . |
| 2,527,674 | 10/1950 | Cold . |
| 2,542,883 | 2/1951 | Tinnerman ............................ 24/295 |
| 2,585,421 | 2/1952 | Nee Dumais . |
| 2,818,624 | 1/1958 | Fauteux . |
| 2,838,056 | 6/1958 | Kertesz . |
| 2,856,666 | 10/1958 | Crothers . |
| 3,371,900 | 3/1968 | Jacobs . |
| 3,414,944 | 12/1968 | Rabinowitz . |
| 3,575,371 | 4/1971 | Carlstedt . |
| 3,631,569 | 1/1972 | Seckerson ............................ 24/295 |
| 3,802,032 | 4/1974 | Weed . |
| 3,908,312 | 9/1975 | Pennec ............................ 49/493.1 |
| 4,023,854 | 5/1977 | Nack, Jr. . |
| 4,402,118 | 9/1983 | Benedetti ............................ 24/295 |
| 4,683,622 | 8/1987 | Oehlke ............................ 24/295 |
| 4,696,128 | 9/1987 | Fukuhara ............................ 49/377 |

FOREIGN PATENT DOCUMENTS

0880263 10/1961 United Kingdom ............. 24/295

Primary Examiner—Victor N. Sakran
Attorney, Agent, or Firm—Robert F. Rywalski; Frank C. Rote, Jr.; Gunther J. Evanina

[57] ABSTRACT

A retaining clip for securing a weather sealing strip to the perimeter of a window opening of an automotive vehicle includes a substantially planar vertical centered portion; an integral downwardly depending, substantially planar arm connected to one side of, and substantially parallel with the central portion; a pair of wings which extend upwardly and outwardly from the downwardly depending arms and being adapted to engage the narrow sides of, and secure the downwardly depending arm within, a narrow rectangular slot formed in a sheet material such as a sheet metal body panel; and an integral, substantially upwardly extending arm connected to the other side of the central portion. The clip is adapted to secure a weather sealing strip between the control portion of the clip and the upwardly extending arm.

In accordance with a preferred aspect of the invention, a tab is provided on a shoulder portion of each wing to facilitate removal of the clip for servicing or replacement.

The clip has a high ratio of extraction force to insertion force to allow for easy installation while reducing the potential of inadvertent removal.

12 Claims, 2 Drawing Sheets

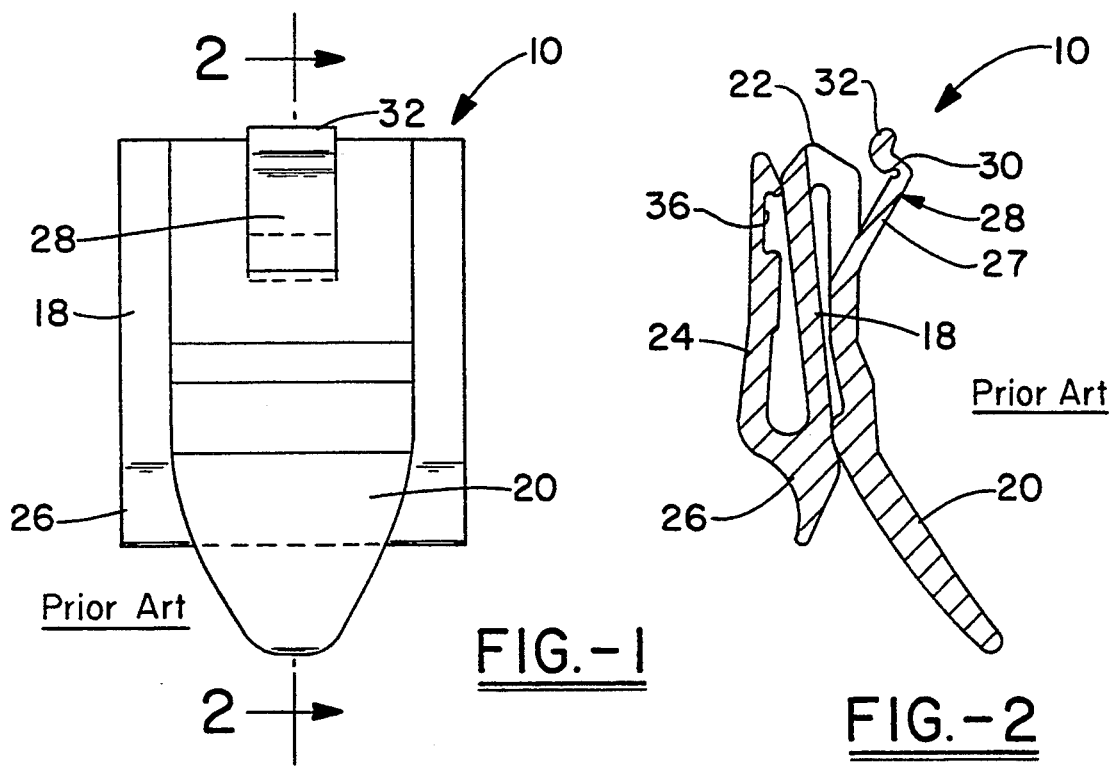
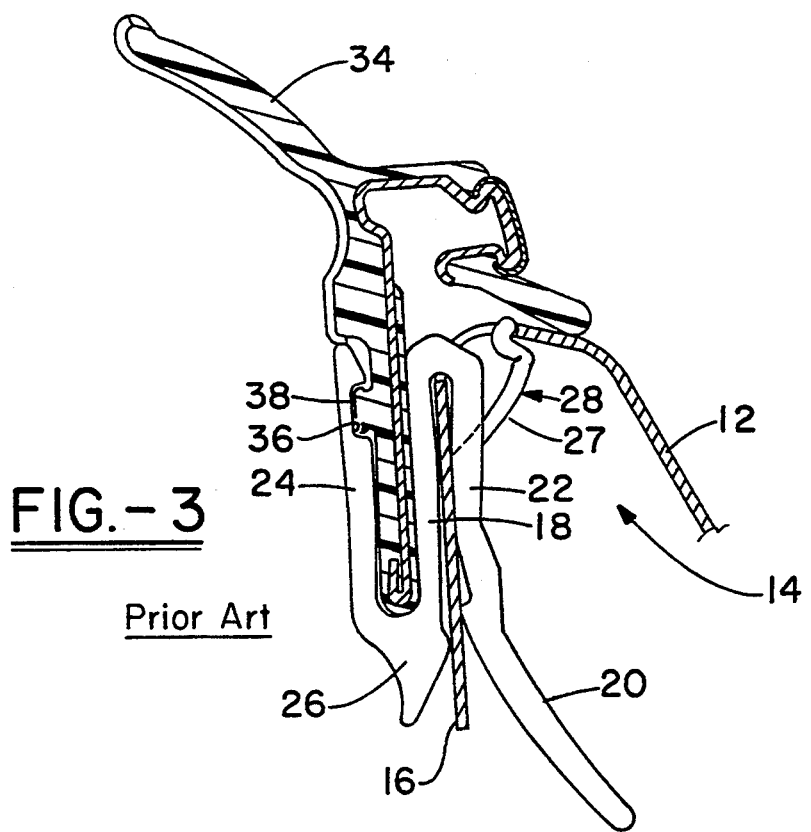

VEHICLE WINDOW WEATHER SEAL RETAINING CLIP

FIELD OF THE INVENTION

The invention relates to a retaining clip for attaching a first article to a second article and more particularly the invention relates to a retaining clip which is adapted to be securely received within a peripheral aperture of a window opening of an automotive vehicle and which is capable of retaining a window weather sealing strip.

BACKGROUND

In the field of automotive weather sealing, retaining clips are frequently used to secure weather sealing strips to the periphery of a window opening. The retaining clips are generally designed so that they can be mounted onto the periphery of the window opening by inserting a portion of the retaining clip into an elongate aperture or slot pierced into the sheet metal defining the window opening. While it is desirable that the retaining clips be capable of being easily inserted into the slots with a minimal amount of force, it is also desirable that the retaining clips upon being inserted into the slots of the window opening are held fast so that they cannot be easily extracted by exerting forces on the retainer clip or attached weather seals in a direction outward from the slot, i.e. a high ratio of extraction forces to insertion forces is highly desired to facilitate installation while also reducing the potential for inadvertent extraction. While it is highly desirable that the extraction forces necessary to remove the clip be relatively high to prevent inadvertent extraction, it is also desirable that the retaining clip be provided with means for facilitating extraction when desired such as for servicing or replacement.

FIGS. 1-3 show a typical prior art retaining clip 10 which is designed to be mounted within a rectangular slot pierced into a narrow surface which defines the lower perimeter or beltline of a window opening in an automotive vehicle door. Referring to FIG. 3, an exposed metal sheet which forms the outer door panel 12 is generally bent or stamped inwardly and then sharply downward to form a narrow inverted U-shaped channel 14 between the outer exposed sheet 12 and an inner downwardly depending leg 16. A narrow, substantially horizontal surface at the top of the inverted U-shaped channel 14 defines the lower periphery of the window opening. A plurality of narrow, rectangular slots are pierced or cut into the sheet metal along the narrow, substantially planar surface defining the lower periphery of the window opening with the long side of the slot aligned with the bottom periphery of the window opening. The retaining clips 10 are designed to be inserted and locked into the rectangular slots. The retaining clip 10 has a sinusoidal-like cross section, as shown in FIG. 2, which is defined by a substantially planar central portion 18, an integral planar arm 20 which extends downwardly from the top of the central portion via an inverted U-shaped portion 22, and an integral planar arm 24 which extends upwardly from the bottom of the central portion via a U-shaped portion 26.

The entire clip 10 is made of a springy or resilient material which when deformed exerts forces in the opposite direction, tending to return the clip to its original shape.

The retaining clip 10 is secured to the bottom periphery of the window opening by pushing the downwardly depending arm 20 through one of the narrow, rectangular slots formed in the narrow, substantially horizontal surface defining the bottom perimeter of the window opening. The retaining clip 10 is pushed through the slot so that the downwardly depending leg 16 is sandwiched between the central portion 18 and arm 20 of the clip. When the retaining clip is nearly fully inserted into the slot, the long outward edge of the slot slidingly engages and inwardly depresses the outward surface 27 of an upwardly projecting springy prong 28 causing the prong to resiliently bend toward the central portion of the clip. The prong 28 has a shoulder portion 30 and an inwardly offset upright lip 32. When the clip 10 is fully inserted the end of the outward surface 27 of the prong 28 slides past the long outward edge of the slot allowing the prong to spring outwardly with the shoulder portion sliding under the long outward edge of the slot until it engages the lip 32 of the prong 28. The springy prong 28 is still partially bent inward from its original position and thus forcibly engages the long outward edge of the slot via lip 32 thereby locking the clip into position.

The upwardly extending arm 24 is shaped and spaced from the central portion 18 to securely accommodate a beltline sealing strip 34. A horizontal groove 36 near the top of the inward wall of the upwardly extending arm 24 is provided to receive a conforming rib 38 of the sealing strip. The rib 38 is narrower at its base than at its top and the groove 36 is wider at its bottom than at its opening to ensure that the sealing strip is firmly secured by the clip.

Because the lip 32 of clip 10 is nearly flush with the top edge of the rectangular slot into which the clip is inserted, there are almost no surfaces to which a tool can be applied to depress the lip to remove the clip. Accordingly, one disadvantage with the prior art retaining clip is that it is difficult to remove such as for purposes of automotive body repair work.

While the lip can be lengthened to extend into the window opening to facilitate removal, this is generally not desirable since it would interfere with and require a bulkier sealing strip design to accommodate an outwardly projecting lip. In addition, such a design would tend to increase the possibility of inadvertent removal of the clip when relatively small forces are laterally exerted on the sealing strip 34.

Another disadvantage with the prior art retaining clip 10 is that while it is relatively difficult to extract from the slot in the window opening for servicing or replacement after the sealing strip has been removed, the amount of force exerted on the retainer clip or attached weather seals in a direction outward from the slot which is needed to inadvertently dislodge the clip 10 from the window periphery is somewhat less than might be desired.

Accordingly, a retaining clip for securing a weather sealing strip to the periphery of a window opening in an automotive vehicle, and having a high ratio of extraction forces to insertion forces to facilitate installation while also reducing the possibility of inadvertent extraction, and which can be easily removed for servicing or replacement yet be free of parts which project substantially above the slotted opening into which it is inserted and retained would have advantages over the prior art and would thus be highly desirable.

SUMMARY OF THE INVENTION

The present invention is a retaining clip for securing a weather sealing strip to the periphery of a window opening in an automotive vehicle, the clip having a high ratio of extraction forces to insertion forces by virtue of a pair of upstanding wings extending upwardly and outwardly from a downwardly depending arm of the clip which is inserted into a narrow rectangular slot in the periphery of a window opening, the wings exerting forces on the edges of the narrow sides of the slot. The invention differs from the prior art in that the clip is locked into position by a pair of upstanding wings which securely engage the narrow sides of a narrow, rectangular slot, instead of a single prong which engages a long side of a narrow rectangular slot.

The retaining clip of the invention is similar to the described prior art clip in that it is adapted to be mounted within a rectangular slot formed into a narrow surface which defines the perimeter of the window opening. The retaining clip of the invention includes a substantially planar central portion, an integral planar arm which extends downwardly from the top of the centered portion via an inverted U-shaped portion, and an integral planar arm which extends upwardly from the bottom of the central portion via a second U-shaped position. The downwardly extending arm which is inserted into the slot formed into the perimeter of the window opening has a pair of upstanding wings which are coplanar with, and extend upwardly from the bottom of each side of, the downwardly extending arm. When the clip is slid into a slot, lateral forces are exerted on the wings pushing them inwardly toward the center of the clip. Upon full insertion, the wings snap outwardly and engage the narrow sides of the slot. Accordingly, attempted removal of the clip is very difficult because the compression breaking strength of the wings must be overcome.

In accordance with a preferred aspect of the invention, tabs are provided to facilitate easy removal of the retaining clip by applying a laterally inward force on the tabs and subsequently pulling the clip out of the slot.

BRIEF DESCRIPTION OF THE DRAWINGS

FIG. 1 is an elevational view of a prior art retaining clip;

FIG. 2 is a cross section along lines 2—2 of FIG. 1;

FIG. 3 is a cross section of prior art retaining clip installed in a slotted opening of a window opening and bearing a weather sealing strip;

DESCRIPTION OF THE PREFERRED EMBODIMENTS

Figure 4:
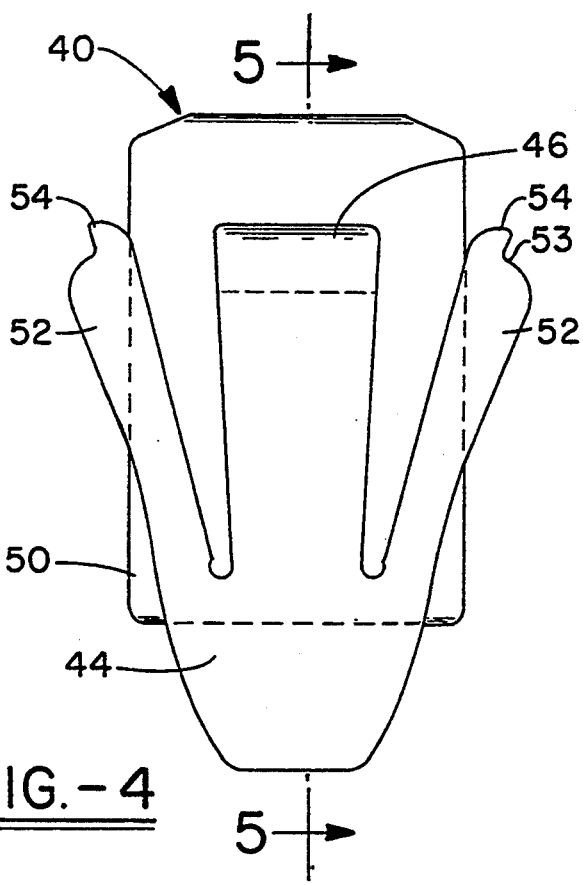
FIG. 4 is an elevational view of a retaining clip in accordance with the invention.
Figure 5:
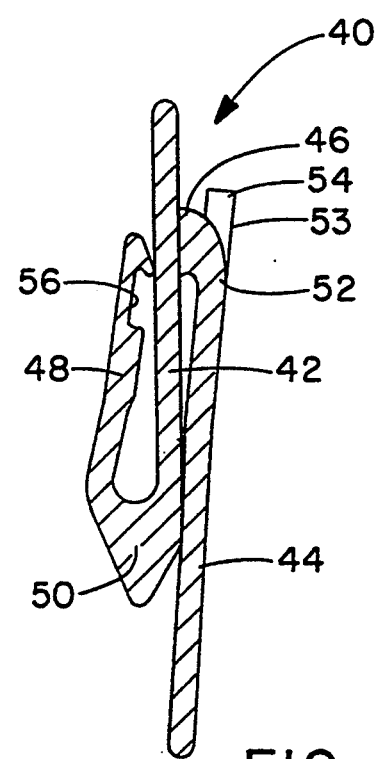
FIG. 5 is a cross sectional edge view along lines 5—5 of FIG. 4.

A retainer clip 40 in accordance with the invention is shown in FIGS. 4 and 5. The clip, as can be seen in FIG. 5, has a generally sinusoidal-like shape. The clip includes a planar central portion 42, an integral downwardly depending arm 44 connected to the central portion by bridge 46, and an integral upwardly extending arm 48 which is connected to the bottom of the central portion by a U-shaped portion 50.

A pair of integral upstanding wings 52 which are generally coplanar with, and extend upward and outwardly from, the downwardly depending arm 44.

Figure 6:
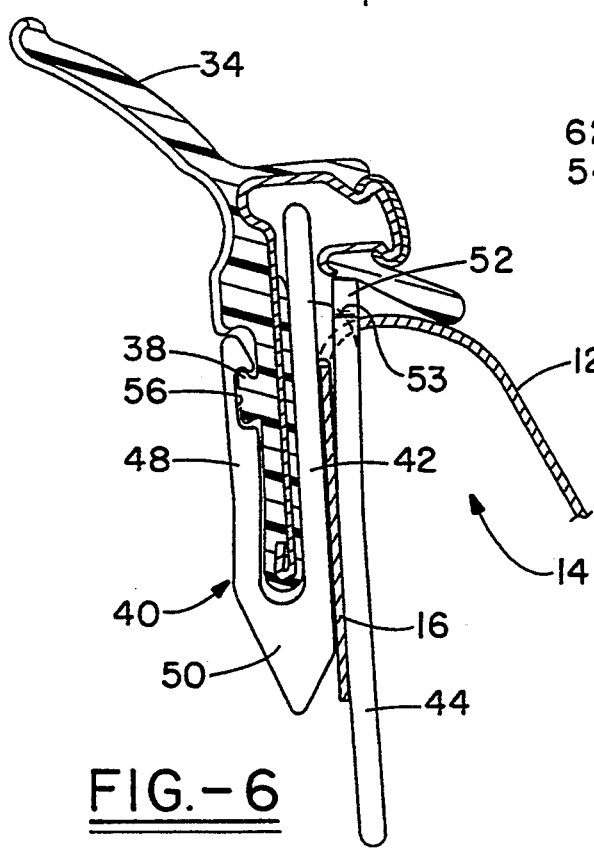
FIG. 6 is a cross section of the clip of FIGS. 4 and 5 installed in a slotted opening of a window opening and bearing a weather seal.
Figure 7:
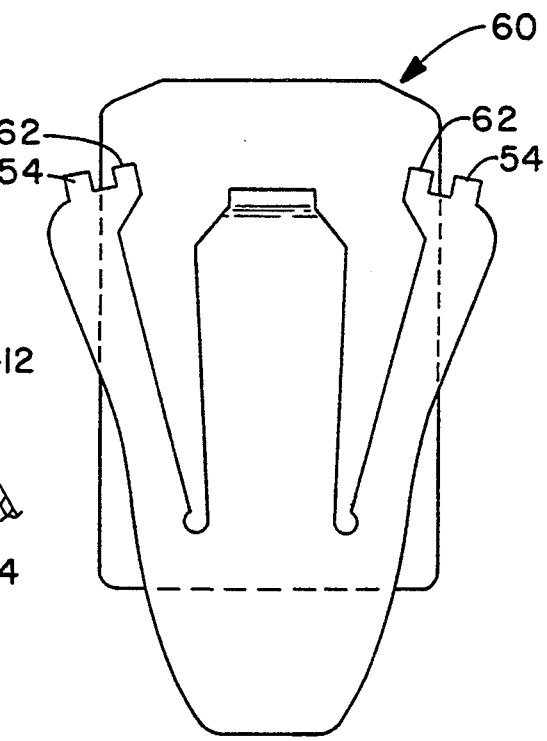
FIG. 7 is an elevational view of an alternative retaining clip in accordance with the invention including an additional refinement.

Referring to FIG. 6, wherein a retaining clip in accordance with the principles of the invention is shown inserted into a rectangular slot formed into the lower perimeter or beltline of a window opening in an automotive vehicle door. An exposed metal sheet which forms the outer door panel 12 is generally bent or stamped inwardly and then sharply downward to form a narrow inverted U-shaped channel 14 between the outer exposed sheet 12 and an inner downwardly depending leg 16. A narrow, substantially horizontal surface at the top of the inverted U-shaped channel 14 defines the lower periphery of the window opening. The narrow rectangular hole or slot into which the clip is inserted is annexed so that long sides are aligned with the perimeter of the window opening.

The entire clip 40 is made of a springy or resilient material, preferably metal such as steel or plastic, which when deformed exerts forces in the opposite direction, tending to return the clip to its original shape.

The retaining clip 40 is secured to the window opening perimeter by pushing the downwardly depending arm 44 through a narrow, rectangular slot formed in the perimeter. The clip is pushed through the slot so that the downwardly depending leg is sandwiched between the central portion 42 and arm 44. When the retaining clip 40 is nearly fully inserted into the slot, the narrow sides of the slot slidingly engage and inwardly depress the outward edges of upstanding arms 52 until the clip is fully inserted, whereupon shoulders 53 slide past the edges of the slot allowing the wings 52 to snap outwardly and slide under the edge of the slot to engage lips 54 locking the clip into position.

The upwardly extending arm 48 is shaped and spaced from the central portion 42 to securely accommodate a beltline sealing strip 34. A horizontal groove 56 can be provided on the inner wall of the upwardly extending arm 48 to receive a conforming rib provided on the sealing strip in order to firmly secure the sealing strip to the clip 40.

In accordance with a preferred aspect of the invention, a retaining clip 60 generally similar to that of the retaining clip shown in FIGS. 4–6 is provided with a projecting tab 62 which is spaced from lip 54 to enable insertion of a tool such as needle-nose pliers between tab 62 and lip 54. The clip can be easily removed applying laterally inward forces on both tabs simultaneously to force wings 52 inward toward the center of the clip and then pulling the clip outward from the slot.

While in accordance with the Patent Statutes, the best mode and preferred embodiment has been set forth, the scope of the invention is not limited thereto, but rather by the scope of the attached claims.

What is claimed is:

1. A clip adapted to be engaged within a rectangular slot on a first object and for retaining a second object, comprising:

a substantially planar vertical central portion;

an integral, downwardly depending, substantially planar arm connected to one side of and substantially parallel with, said central portion;

a pair of wings coplanar with and extending upwardly and outwardly from said downwardly depending arm, said wings including means for engaging opposing narrow edges of said rectangular slot to secure said downwardly depending arm within said rectangular slot; and an integral, substantially upwardly extending arm connected to the other side of said central portion, said second object being securable between said central portion and said upwardly extending arm.

2. A clip as set forth in claim 1, wherein the upwardly extending arm is shaped to conform to, and spaced from said central portion to, securely receive an object therebetween.

3. A clip as set forth in claim 2, wherein the upwardly extending arm has a tapered groove for receiving a projecting rib on an object to be secured between said upwardly extending arm and said central portion.

4. A clip as set forth in claim 1, wherein the means for engaging the sides of a slot comprises a lip projecting upwardly from a shoulder on each of said wings.

5. A clip as set forth in claim 4, further comprising a tab on the shoulder of each wing to facilitate removal of said clip from a narrow rectangular slot formed in a sheet material.

6. A clip as set forth in claim 5, wherein each of said tabs is inwardly spaced away from said lip and toward the centerline of said clip to allow for the application of a laterally inward force on said tabs.

7. A retaining clip for securing a weather sealing strip to the perimeter of a window opening in an automotive vehicle, said clip comprising:

a substantially planar, vertical central portion;

an integral, downwardly depending, substantially planar arm connected to one side of, and substantially parallel with, said central portion;

a pair of wings coplanar with and extending upwardly and outwardly from said downwardly depending arms, said wings including means for engaging opposing narrow sides of a rectangular slot in said perimeter of said window opening to secure said downwardly depending arm within said slot; and an integral, substantially upwardly extending arm connected to the other side of said central portion, said weather sealing strip being securable between said central portion and said upwardly extending arm.

8. A retaining clip as set forth in claim 7, wherein the upwardly extending arm is shaped to conform to, and spaced from said central portion to, securely receive a weather sealing strip.

9. A retaining clip as set forth in claim 8, wherein the upwardly extending arm has a tapered groove for receiving a projecting rib on a weather sealing strip to be secured between said upwardly extending arm and said central portion.

10. A retaining clip as set forth in claim 8, wherein the means for engaging the sides of a slot comprises a lip projecting upwardly from a shoulder on each of said wings.

11. A retaining clip as set forth in claim 10, further comprising a tab on the shoulder of each wing to facilitate removal of said clip from a narrow rectangular slot formed in a sheet material.

12. A retaining clip as set forth in claim 11, wherein each of said tabs is inwardly spaced away from said lip and toward the centerline of said clip to allow for the application of a laterally inward force on said tabs.

* * * * *